(12) United States Patent
Wu et al.

(10) Patent No.: US 11,105,542 B2
(45) Date of Patent: Aug. 31, 2021

(54) GENERATOR AND CONDENSING SYSTEM

(71) Applicant: Wuyi University, Jiangmen (CN)

(72) Inventors: Min Wu, Jiangmen (CN); Fan Zhu, Jiangmen (CN)

(73) Assignee: Wuyi University, Jiangmen (CN)

( * ) Notice: Subject to any disclaimer, the term of this patent is extended or adjusted under 35 U.S.C. 154(b) by 0 days.

(21) Appl. No.: 16/806,723

(22) Filed: Mar. 2, 2020

(65) Prior Publication Data

US 2021/0199354 A1 Jul. 1, 2021

(30) Foreign Application Priority Data

Dec. 27, 2019 (CN) .......................... 201922446168.6

(51) Int. Cl.
*F25B 25/02* (2006.01)

(52) U.S. Cl.
CPC ................................... *F25B 25/02* (2013.01)

(58) Field of Classification Search
CPC .......... F25B 25/02; F25B 15/00; F25B 35/00; F25B 2333/00; F25B 2333/006

USPC ........................................................ 62/335
See application file for complete search history.

(56) References Cited

U.S. PATENT DOCUMENTS

| 3,402,570 | A | * | 9/1968 | Schlichtig | ............... | F25B 15/00 |
| | | | | | | 62/483 |
| 3,407,625 | A | * | 10/1968 | McDonald | .............. | F25B 33/00 |
| | | | | | | 62/476 |
| 4,377,398 | A | * | 3/1983 | Bennett | ................. | F25B 27/007 |
| | | | | | | 96/146 |

* cited by examiner

*Primary Examiner* — Steve S Tanenbaum
(74) *Attorney, Agent, or Firm* — Vivacqua Crane

(57) ABSTRACT

Disclosed are a generator and a condensing system. The generator, a rectifier, a condenser, an evaporator, an absorber and a liquid storage tank are sequentially connected to form a loop, a gas outlet chamber is communicated with the rectifier by a lifting pipe, and a liquid conveying pipe is arranged between a heating chamber and the liquid storage tank. The generator includes the heating chamber and the gas outlet chamber, wherein the gas outlet chamber is connected with the lifting pipe, and has a width gradually reduced in a gas outlet direction.

8 Claims, 3 Drawing Sheets

GENERATOR AND CONDENSING SYSTEM

CROSS-REFERENCE TO RELATED APPLICATIONS

This application is based on and claims the benefit of priority from Chinese Patent Application No. 2019224461686, filed on 27 Dec. 2019, the entirety of which is incorporated by reference herein.

FIELD

The disclosure relates to the field of refrigeration systems, in particular to a generator and a condensing system.

BACKGROUND

As an important component of a condensing system, a generator is used for heating to evaporate the concentrated ammonia water and drive ammonia to circulate in the whole condensing system. However, when the concentrated ammonia water in an existing generator is evaporated and enters a rectifier, a portion of the ammonia is easy to flow backwards during movement, thus reducing the refrigeration efficiency.

SUMMARY

The disclosure aims to solve at least one of the technical problems existing in the prior art. Therefore, the disclosure provides a generator, which can promote ammonia to be discharged into a rectifier and reduce backflow.

The disclosure further provides a condensing system including the above generator.

The generator according to a first aspect embodiment of the disclosure includes a heating chamber, and a gas outlet chamber connected with a lifting pipe, and the gas outlet chamber having a width gradually reduced in a gas outlet direction.

The generator according to the embodiment of the disclosure at least has the following beneficial effects: the ammonia evaporated from the heating chamber enters the gas outlet chamber and then enters a rectifier along the gas outlet chamber, and during the flowing process, a channel gradually narrows to speed up the flow rate, which promotes the ammonia to enter the rectifier and blocks some ammonia with backflow tendency, thus greatly reducing backflow and improving refrigeration efficiency.

According to some embodiments of the disclosure, a lower part of the heating chamber is connected with a liquid conveying pipe, and a right angle is formed at a joint between the heating chamber and the liquid conveying pipe. The right angle can block the ammonia from flowing backwards, thus changing the path of the gas and preventing backflow.

According to some embodiments of the disclosure, the gas outlet chamber is stepped.

According to some embodiments of the disclosure, steps on the gas outlet chamber are provided with rounded corners. The steps with rounded corners can guide the flow of ammonia, thus promoting the ammonia to flow towards the lifting pipe.

According to some embodiments of the disclosure, an inner wall of the gas outlet chamber is of a concave arc shape.

The condensing system according to a second aspect embodiment of the disclosure includes any one of the above generators, a rectifier, a condenser, an evaporator, an absorber and a liquid storage tank which are sequentially connected to form a loop, the gas outlet chamber is communicated with the rectifier by the lifting pipe, and the liquid conveying pipe is arranged between the heating chamber and the liquid storage tank.

The condensing system according to the embodiments of the disclosure at least has the following beneficial effects: the ammonia evaporated from the heating chamber enters the gas outlet chamber and then enters the rectifier along the gas outlet chamber, and during the flowing process, a channel gradually narrows to speed up the flow rate, which promotes the ammonia to enter the rectifier and blocks some ammonia with backflow tendency, thus greatly reducing backflow and improving refrigeration efficiency.

According to some embodiments of the disclosure, the lifting pipe is externally sheathed with a sleeve which is communicated with the absorber. After evaporating the ammonia, the remaining dilute ammonia water reenters the absorber and enters the liquid storage tank along with the ammonia in the absorber.

Additional aspects and advantages of the disclosure will be set forth in part in the following description, and will become apparent from the following description, or will be learned through the practice of the disclosure.

BRIEF DESCRIPTION OF THE DRAWINGS

The above and/or additional aspects and advantages of the disclosure will become apparent and readily understood from the description of the embodiments taken in conjunction with the following drawings, in which.

DETAILED DESCRIPTION OF THE EMBODIMENTS

Embodiments of the disclosure will be described below in detail. Examples of the embodiments are shown in the Figures, in which same or similar reference numbers refer to same or similar elements or elements having same or similar functions throughout. The embodiments described below with reference to the accompanying drawings are exemplary, and are only used for explaining the disclosure, not used for limiting the disclosure.

It should be understood in the description of the disclosure that terms such as "upper", "lower", "front", "back", "left", "right" etc. indicate direction or position relationships shown based on the drawings, and are only intended to facilitate the description of the disclosure and the simplification of the description rather than to indicate or imply that the indicated device or element must have a specific direction or constructed and operated in a specific direction, and therefore, shall not be understood as a limitation to the disclosure.

In the description of the disclosure, the meaning of "several" refers to one or more; the meaning of "a plurality of" refers to two or more; greater than, less than and more than are understood as not including the number itself; and above, below, and within are understood as including the number itself. The terms such as "first" and "second" are only used for the purpose of differentiating technical features, rather than being understood to indicate or imply relative importance or implicitly indicate the number of indicated technical features or the order of the indicated technical features.

In the description of the disclosure, the terms such as "arrangement", "installation," and "joint" shall be understood in a broad sense. Those skilled in the art can reasonably determine the specific meanings of the above words in the disclosure in combination with the specific contents of the technical solution.

Figure 1:
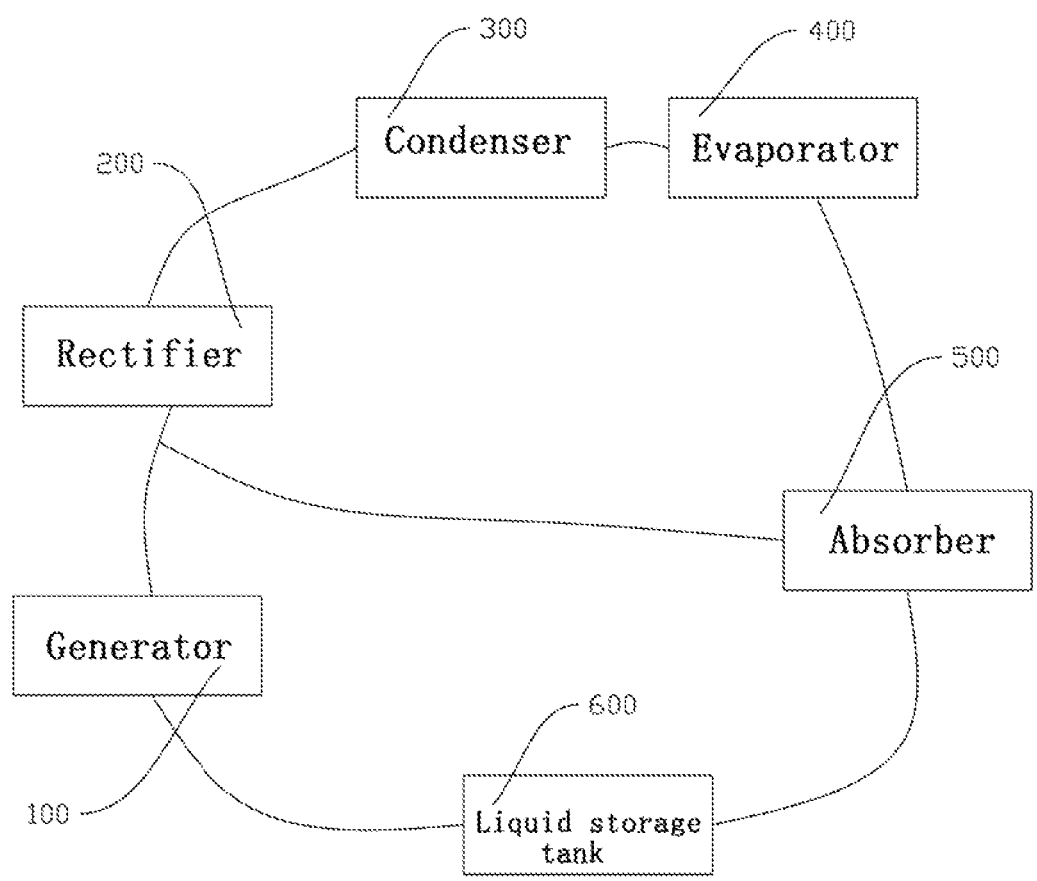
FIG. 1 is a schematic structural diagram of a condensing system according to embodiments of the disclosure.

Referring to FIG. 1, there is shown a condensing system, including a generator 100, a rectifier 200, a condenser 300, an evaporator 400, an absorber 500 and a liquid storage tank 600, wherein the generator 100, the rectifier 200, the condenser 300, the evaporator 400, the absorber 500 and the liquid storage tank 600 are sequentially connected to form a loop. The gas outlet chamber 120 is communicated with the rectifier 200 by the lifting pipe 130, and a liquid conveying pipe 140 is arranged between the heating chamber 110 and the liquid storage tank 600. Ammonia sequentially flows from the generator 100, the rectifier 200, the condenser 300, the evaporator 400, the absorber 500 and the liquid storage tank 600 to realize ammonia circulation, and cool the outside air in the evaporator 400.

Figure 2:
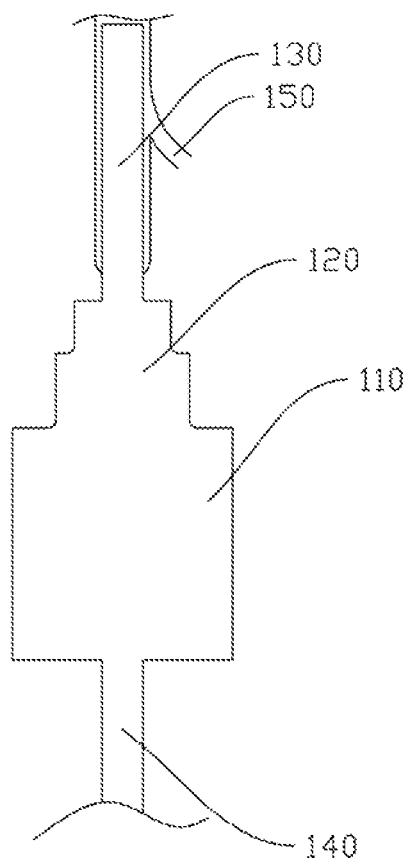
FIG. 2 is a schematic structural diagram of a first embodiment of a generator according to embodiments of the disclosure.

Referring to FIG. 2, in the first embodiment, the generator 100 includes a heating chamber 110 and a gas outlet chamber 120. The gas outlet chamber 120 is connected with a lifting pipe 130, and has a width gradually reduced in a gas outlet direction. Concentrated ammonia water is heated in the generator 100, and ammonia is evaporated and enters the gas outlet chamber 120, and then enters the rectifier 200 along the gas outlet chamber 120. During the process that the ammonia enters the lifting pipe 130, a flowing channel gradually narrows to speed up the flow rate, which promotes the ammonia to enter the rectifier 200 and blocks some ammonia with backflow tendency, thus greatly reducing backflow and improving refrigeration efficiency. In this embodiment, the gas outlet chamber 120 is stepped, and steps on the gas outlet chamber 120 are provided with rounded corners. The steps with rounded corners can guide the flow of ammonia, thus promoting the ammonia to flow towards the lifting pipe 130. A right angle is formed at a joint between the heating chamber 110 and the liquid conveying pipe 140. The right angle can block the ammonia from flowing backwards, thus changing the path of the gas and preventing backflow.

Figure 3:
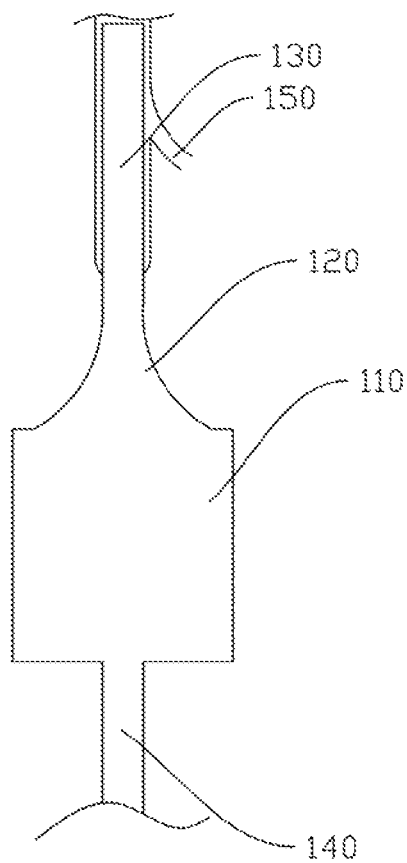
FIG. 3 is a schematic structural diagram of a second embodiment of a generator according to embodiments of the disclosure.

Referring to FIG. 3, in the second embodiment, the generator 100 includes a heating chamber 110 and a gas outlet chamber 120. The gas outlet chamber 120 is connected with a lifting pipe 130, and has a width gradually reduced in the gas outlet direction. Concentrated ammonia water is heated in the generator 100, and ammonia is evaporated and enters the gas outlet chamber 120, and then enters the rectifier 200 along the gas outlet chamber 120. During the process that the ammonia enters the lifting pipe 130, a flowing channel gradually narrows to speed up the flow rate, which promotes the ammonia to enter the rectifier 200 and blocks some ammonia with backflow tendency, thus greatly reducing backflow and improving refrigeration efficiency. In this embodiment, an inner wall of the gas outlet chamber 120 is of a concave arc shape. The inner wall of a concave arc shape can guide the flow of ammonia, thus promoting ammonia to flow towards the lifting pipe 130. A right angle is formed at a joint between the heating chamber 110 and the liquid conveying pipe 140. The right angle can block the ammonia from flowing backwards, thus changing the path of the gas and preventing backflow.

In the above two embodiments, referring to FIGS. 2 and 3, the lifting pipe 130 is externally sheathed with a sleeve 150 which is communicated with the absorber 500. After evaporating ammonia, the remaining dilute ammonia water reenters the absorber 500 and then enters the liquid storage tank 6000 along with the ammonia in the absorber 500.

Embodiments of the disclosure are described above in detail with reference to the accompanying drawings. However, the disclosure is not limited to the above embodiments. Within the scope of the knowledge possessed by those skilled in the art, various changes can be made without departing from the purpose of the disclosure.

We claim:

1. A generator, comprising:
   a heating chamber, and
   a gas outlet chamber connected with a lifting pipe, the gas outlet having a width gradually reduced in a gas outlet direction;
   wherein the gas outlet chamber is stepped.

2. The generator of claim 1, wherein a lower part of the heating chamber is connected with a liquid conveying pipe, and a right angle is formed at a joint between the heating chamber and the liquid conveying pipe.

3. The generator of claim 1, wherein steps on the gas outlet chamber are provided with rounded corners.

4. A condensing system, comprising a generator, a rectifier, a condenser, an evaporator, an absorber and a liquid storage tank which are sequentially connected to form a loop, the generator comprising:
   a heating chamber, and
   a gas outlet chamber connected with a lifting pipe, the gas outlet having a width gradually reduced in a gas outlet direction;
   wherein the gas outlet chamber is communicated with the rectifier by the lifting pipe, and a liquid conveying pipe is arranged between the heating chamber and the liquid storage tank; and
   wherein the lifting pipe is externally sheathed with a sleeve which is communicated with the absorber.

5. The condensing system of claim 4, wherein a lower part of the heating chamber is connected with the liquid conveying pipe, and a right angle is formed at a joint between the heating chamber and the liquid conveying pipe.

6. The condensing system of claim 4, wherein the gas outlet chamber is stepped.

7. The condensing system of claim 6, wherein steps on the gas outlet chamber are provided with rounded corners.

8. The condensing system of claim 4, wherein an inner wall of the gas outlet chamber is of a concave arc shape.

* * * * *